US008825403B1

(12) United States Patent  
Kadous et al.

(10) Patent No.: US 8,825,403 B1
(45) Date of Patent: Sep. 2, 2014

(54) USER QUERIES TO MODEL ROAD NETWORK USAGE

(75) Inventors: Mohammed Waleed Kadous, Sunnyvale, CA (US); Joakim Kristian Olle Arfvidsson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 239 days.

(21) Appl. No.: 13/267,716

(22) Filed: Oct. 6, 2011

Related U.S. Application Data

(60) Provisional application No. 61/390,578, filed on Oct. 6, 2010.

(51) Int. Cl.
*G01C 21/00* (2006.01)

(52) U.S. Cl.
USPC ............ 701/533; 701/527; 701/532; 701/540

(58) Field of Classification Search
CPC ........... G01C 21/3453; G01C 21/3461; G01C 21/367; G06T 11/60
USPC .......... 345/428, 581, 619; 701/527, 533, 532, 701/432, 437, 455, 457, 400, 540
See application file for complete search history.

(56) References Cited

U.S. PATENT DOCUMENTS

| 5,893,081 A * | 4/1999 | Poppen .......................... 705/400 |
| 2002/0169543 A1* | 11/2002 | Blewitt .......................... 701/202 |
| 2010/0332119 A1 | 12/2010 | Geelen et al. |
| 2011/0093188 A1* | 4/2011 | Barkai et al. .................. 701/200 |
| 2011/0137551 A1* | 6/2011 | Peri ................................ 701/201 |
| 2012/0046860 A1 | 2/2012 | Curtis et al. |

* cited by examiner

*Primary Examiner* — Helal A Algahaim
*Assistant Examiner* — Genna Mott
(74) *Attorney, Agent, or Firm* — Fenwick & West LLP (57) ABSTRACT

A system and method determines a plurality of scores for a road segment that are related to the total distance traveled when drivers traverse that road segment. The scores are displayed graphically to illustrate the usage of road segments. The scores are also used to determine which road segments to display on a map when determining which roads to display at a given zoom level for a map.

18 Claims, 6 Drawing Sheets

USER QUERIES TO MODEL ROAD NETWORK USAGE

RELATED APPLICATIONS

This application claims the benefit of U.S. Provisional Application No. 61/390,578, filed Oct. 6, 2010, which is hereby incorporated by reference herein.

BACKGROUND

1. Field of Art

The present invention relates generally to the field of digital information processing, and more specifically to generating and analyzing routes based on digital maps.

2. Background of the Invention

Digital maps, such as those provided by GOOGLE INC., are used in a wide variety of electronic devices, such as car navigation systems and mobile phones. Users rely on digital maps, as well as routes generated in response to queries for directions between places on the digital maps, to provide comprehensive and accurate information about roads and other geographic features for purposes including navigation and education. Therefore, the map data should be as accurate and complete as possible.

Which roads to display on a map at a particular zoom level is one area which can lead to maps being less informative than they could be. Traditionally, which roads to display has been determined by the classification of the road by a governmental entity. These classifications include interstate highways, state highways, county roads, etc. All roads within a given classification are usually shown or not shown at a particular zoom level without taking into account how the roads are actually used. For example, when looking at map of a large area, all interstate highways are shown but no county roads are shown. In fact, some county roads may be used to go long distances. Map users planning longer trips are often looking at a single map covering the entire area of their trip, but that conventionally only shows large roads like interstate highways.

SUMMARY

A system and method analyzes routing directions between endpoints on a map to determine usage characteristics of roads. Roads are analyzed by the individual road segments that make up the roads. The road segments are analyzed using routes determined in response to queries by users for directions.

The method comprises receiving a plurality of routes, traversing road segments between first endpoints and second endpoints on a geographic map, wherein multiple routes traverse a same road segment; determining a route-based score for the road segment for each of the multiple routes that traverse the road segment, the route-based score for a route based on a first distance from the first endpoint of the route to the road segment and a second distance from the second endpoint of the route to the road segment; determining a segment score describing usage of the road segment for the road segment based on the route-based scores; and storing the segment score in association with the road segment on the geographic map.

In one embodiment, the route-based score is the shorter of the two distances.

In one embodiment, the segment score for each road segment comprises determining the highest route-based score for the road segment.

In one embodiment, further smoothing of the scores is accomplished by adjusting the route-based score for each road segment in each of the plurality of routes based on the segment score for the road segment and the segment scores for additional road segments adjacent to the road segment; aggregating the adjusted route-based score for each road segment; and determining an adjusted segment score for each road segment based on each of the adjusted route-based scores for the road segment.

Optionally a graphical representation of the segment score and/or the adjusted segment score is displayed on a map.

In one embodiment the segment score for a road segment is evaluated in connection with a display threshold; and a graphical map of the geographic map is rendered selectively displaying the road segment responsive to the evaluation with the display threshold.

Further described are systems and non-transitory computer readable media for implementing the disclosed methods.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
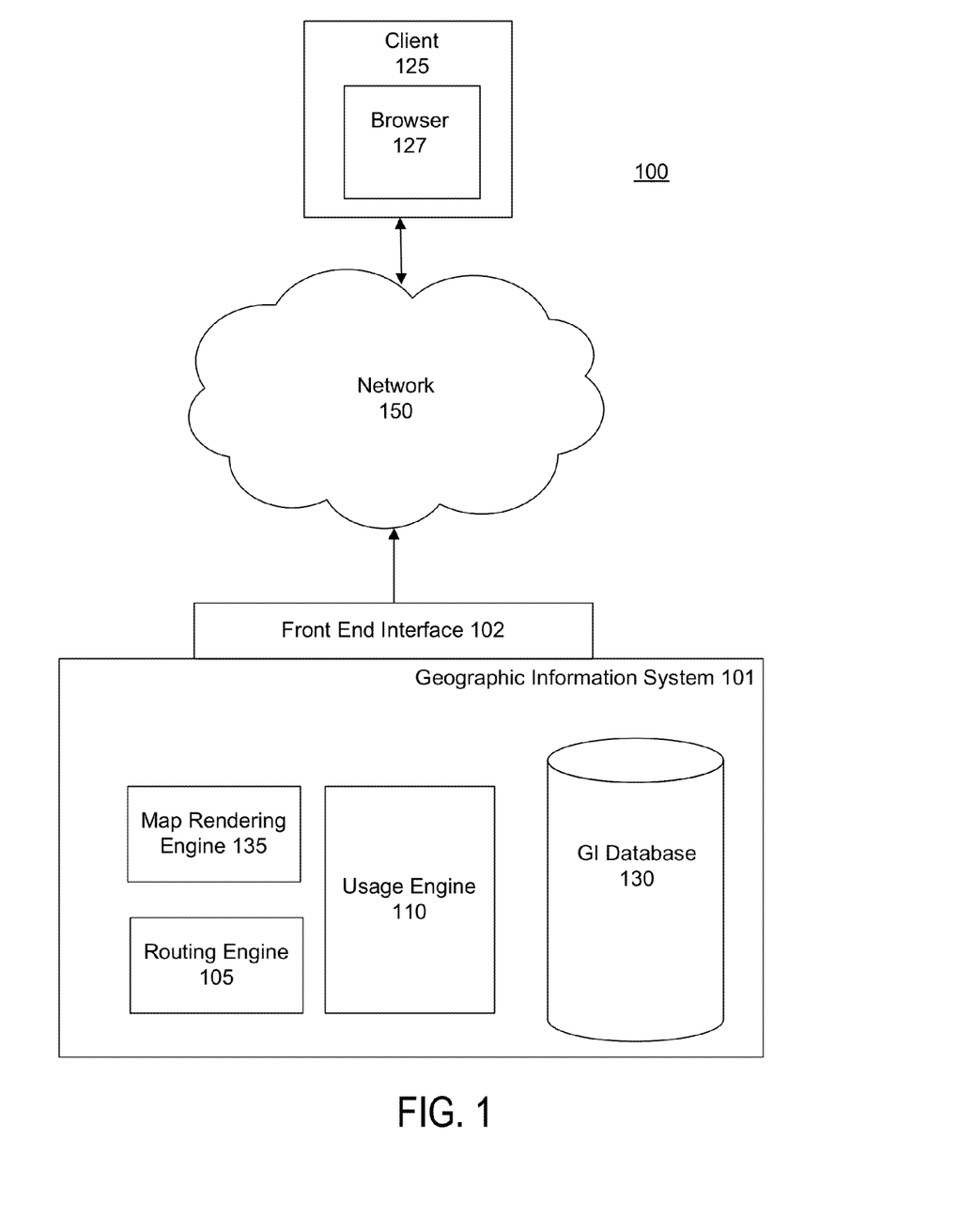
FIG. 1 is a high-level block diagram illustrating an environment for analyzing routes generated in response to user queries.

FIG. 1 is a high-level block diagram illustrating an environment 100 for analyzing user queries for routes to model road network usage. The environment 100 includes a geographic information ("GI") system 101 which communicates with a client 125 via a front end interface 102 of the GI system 101 and a network 150.

A client 125 is a computing device executing software that requests map data from the GI system 101 and performs actions based on that map data, such as presenting the map data in graphical form to a user of the computing device and presenting routes and driving directions. For example, the client 125 can be a desktop, notebook, or tablet computer, a mobile telephone, or a navigation device. A conventional desktop computer system executing the web-based GOOGLE MAPS application is one example of a client 125. In some embodiments, the client 125 includes position determination functionality, such as functionality using the Global Positioning System (GPS) and the client can use this functionality to obtain map data for the vicinity of the client. The client 125 may receive the map data in raw form and graphically render the data itself, or it may receive the data already in a rendered, displayable format, such as part of a map web page.

The client 125 further comprises a client application for displaying information about map features, maps, route information and receiving the user queries for maps. In one embodiment the client application is a browser 127. The browser 127 is any browser known in the art. For simplicity only one client 125 is shown. In practice, very large numbers (e.g., millions) of clients 125, or as many as can be supported by the hardware and software implementation, can be in communication with the GI system 101 at any time.

The GI system 101 includes a routing engine 105, a usage engine 110, a map rendering engine 135 and a geographic information ("GI") database 130. For clarity, only one routing engine 105, usage engine 110, map rendering engine 135 and GI database 130 are shown, but in practice, several of each may be in operation.

The GI database 130 stores map data. The map data may be stored using any type of data storage system. Map data includes map features and their attributes. A map feature is anything that might appear on a map that would be of interest to those using a map. Map features include, but are not limited to, natural features such as bodies of water, mountains, forests, rivers, and so forth; man-made features, such as cities, addresses, roads, road segments, businesses, airports, train stations, stadiums, ports, buildings; and points of interest (POI) such as historic sites, and landmarks. Attributes of map features are characteristics of the map feature that identify, locate, or describe the feature, and include, for example, the latitude and longitude of the map feature, and the name of the feature. Additional attributes are appropriate depending on the type of map feature. Generally, attributes are any pieces of information about a map feature that are useful to users of maps, and can describe the physical, contextual, or semantic aspects of a map feature.

Each road on a map is divided into road elements, each element being either a road segment or an intersection that joins road segments. A road segment represents a traversable path from one location to another. In one embodiment, a road segment is represented by one or more line segments (i.e., a polyline). In other embodiments, a road segment is represented by exactly one line segment, or may additionally be represented by a line or other curve. An intersection represents a location at which one can transition from one road segment to a different road segment. For example, where two roads cross and it is possible (e.g., both physically possible and legally permissible) to make a turn from one road to the other, there is an intersection for the two roads; if, however, no such transition from one road to another were possible (or legally permissible), such as in the case of a highway overpass crossing over another road, there is no intersection. Road segments can also be determined by distance. This is useful for roads that go long distances without intersecting with another road. In such an example, a new road segment starts every mile, every half mile or some other predetermined distance. Road segments are said to be adjacent to two other road elements, in that a road segment typically terminates, at each end, either in another road segment. However, in some cases a given road segment may have fewer than two adjacent road elements, such as a road segment at the end of a cul de sac. A path between any two given locations is thus composed of a (potentially large) number of road segments and intersections, ordered in a sequence from the source location to the destination location.

Road segments have associated attributes, such as:
the one or more names of a road of which the road segment is a part (e.g. "Main Street" or "I-80");
the segment location (e.g., geographic coordinates corresponding to the midpoint of the segment, or a pair of geographic coordinates corresponding to the segment endpoints);
the segment length;
the road type (e.g., a paved road, unpaved road, railroad, bicycle path, or ferry line);
the road usage (e.g., ramp, roundabout, or parking lot);
the priority of the road segment (e.g., an ordered set of values, such as—from lowest to highest priority—"local", "minor arterial", "major arterial", "secondary highway", "primary highway", "limited access", and "controlled access" (also referred to as a freeway), with certain contiguous subsets constituting priority ranges, such "nontraffic", "terminal", and "local" representing a local roads range, and "minor arterial", "major arterial", "secondary highway", "primary highway", "limited access", and "controlled access" representing an arterial roads range);
the speed limit;
the directionality of the road segment (e.g., whether one-way or two-way, and if one-way, in which direction);
whether the road segment is a ramp onto a high-priority road segment, such as a freeway;
whether the road segment has a toll fee associated with it;
a grade level associated with the road segment and roughly corresponding to an altitude (e.g., an overpass, a tunnel, or a road at ground level);
any turn restrictions associated with that segment (e.g., no right turns at a given intersection);
sign information associated with the road segment and having a direction (e.g., a sign "To Main Street" for a freeway segment and associated with one of directions on the segment);
associated observed data, such as global positioning system (GPS) readings obtained from vehicles travelling across that road segment;
whether the road is a split road (i.e., corresponds to one of the two directions on a physical two-way road);
a score, the radius of the road segment, indicative of how far users are travelling when using that road segment; and
a range of addresses associated with the segment (such as "100-250" traveling in one direction, and "101-251" traveling in the other direction).

The exact list of attributes and their different possible values can vary in different embodiments. For example, the priority attribute may have different possible priorities than those listed above.

The routing engine 105 determines routes from an origination point to a destination in response to queries from users submitted at clients 125. The routing engine 105 may use any of a number of different algorithms for determining efficient routes, such as Dijkstra's algorithm or the A* algorithm. The routing engine 105 also determines routes for saved queries in addition to responding to the real-time inquiries from users. In one embodiment, routes returned to a user are displayed on a map. In some embodiments the whole route is shown on a single map. The route can also be displayed as a series of small maps displaying points in the route where a user makes a turn. Additionally or alternatively the route is displayed as written directions.

The map rendering engine 135 provides maps for display to users using the geographic information in the GI database 130. The map rendering engine 135 can provide map data to be rendered graphically at the client 125 or graphically render the data into a displayable format, such as an image file, and provide that for display at the client 125. The map rendering engine 135 provides maps upon which requested routes determined by the routing engine 105 are displayed.

The usage engine 110 determines scores, also known as radii, for road segments that indicate the length of routes of which the road segment is a part. The usage engine 110 determines a variety of adjusted scores to smooth the data. The usage engine 110 analyzes the routes encompassing the road segment requested by users from the routing engine 105. In one embodiment, the radius is measured in numbers of road segments. In an alternative embodiment, the radius is measured in kilometers, meters, miles or feet. The farther users are traveling when using a particular road segment, the higher the radius for that road segment. The operation of the usage engine 110 and the determination of the radius for a road segment are described in greater detail in reference to FIGS. 3-5.

The network 150 represents the communication pathway between the GI system 101 and the client 125. In one embodiment, the network 150 uses standard communications technologies and/or protocols and can include the Internet. Thus, the network 150 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 150 can use custom and/or dedicated data communications technologies instead of, or in addition to, the ones described above.

In some embodiments, the functions are distributed among the modules in a different manner than described herein. For example, the usage engine 110 may be separated from the other portions of the GI system 101 and access the GI system 101 via the network 150. The routing engine 105 may similarly be separated from the GI system 101 and also access the GI system 101 via the network 150.

Figure 2:
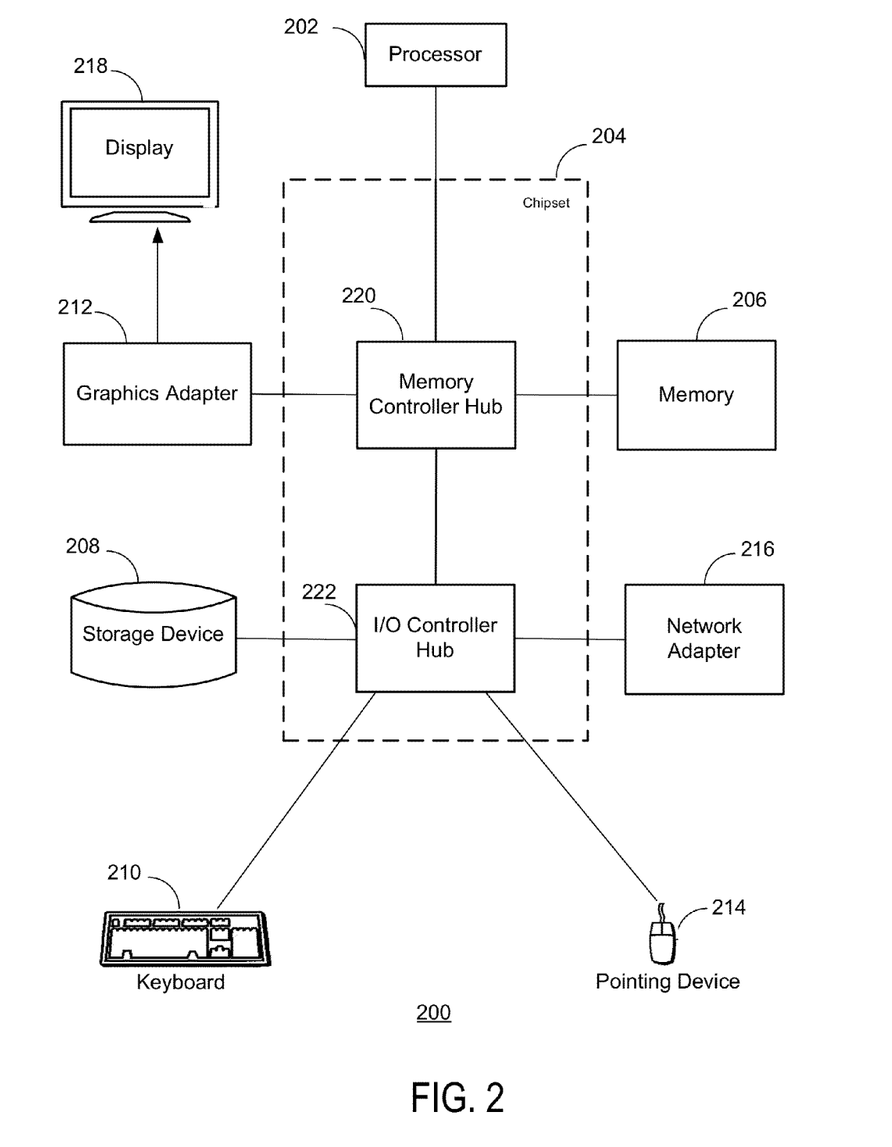
FIG. 2 is a high-level block diagram illustrating an example of a computer for use as a geographic information system and/or a client, in accordance with one embodiment.

FIG. 2 is a high-level block diagram illustrating an example of a computer 200 for use as a GI system 101 and/or a client 125, in accordance with one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 150.

Some embodiments of the computer 200 have different and/or other components than those shown in FIG. 2. For example, the GI system 101 can be formed of multiple blade servers and lack a display device 218, keyboard 210, and other components. Moreover, the storage device 208 can be local and/or remote from the computer 200 (such as embodied within a storage area network (SAN)).

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202. Example program modules include the routing engine 105, usage engine 110 and map rendering engine 135.

Figure 3:
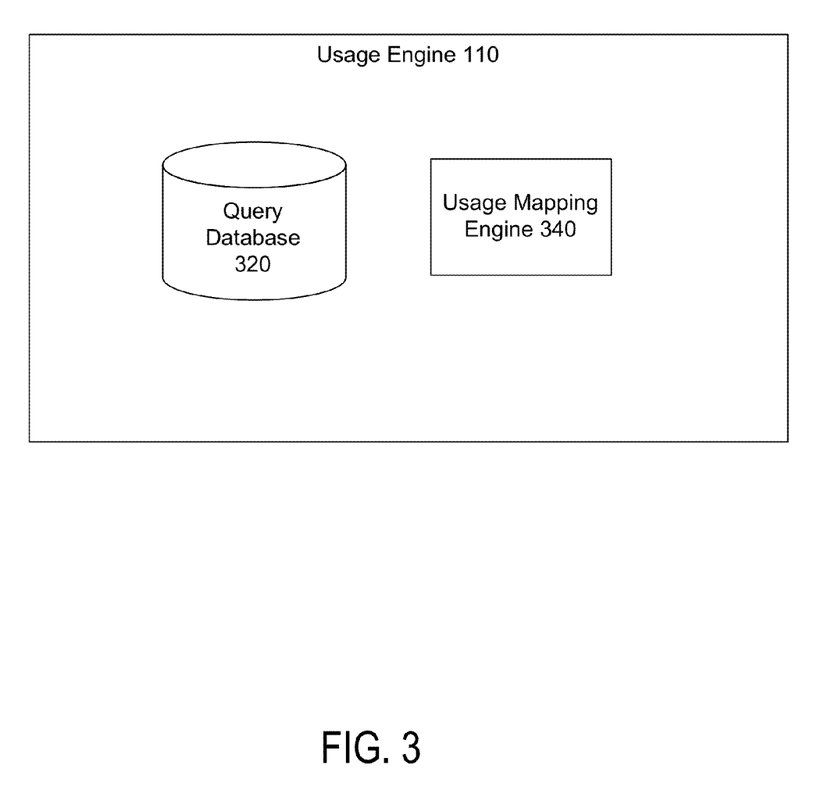
FIG. 3 is a high-level block diagram illustrating a detailed view of the usage engine geographic information system according to one embodiment.

FIG. 3 is a high-level block diagram illustrating a detailed view of the usage engine 110 according to one embodiment. As shown in FIG. 3, the usage engine 110 includes a query database 320 and a usage mapping engine 340. In some embodiments, the functions are distributed among the modules in a different manner than described herein. For example, the query database 320 may be separated from the other portions of the GI system 101 and access the GI system 101 via the network 150.

The query database 320 stores queries submitted by users requesting routes. Queries typically are a request for a route between a start point and an end point. Some queries include designation of additional locations through which the route should traverse. These might be stops to make along the way. Queries can include requested characteristics for the route such as the most direct route, the fastest route or a route without toll roads.

The usage mapping engine 340 prepares graphic representations of the usage of roads using the radius determined for road segments. The working of the usage mapping engine 340 is discussed in greater detail in the use case below and in reference to FIG. 6.

Figure 4:
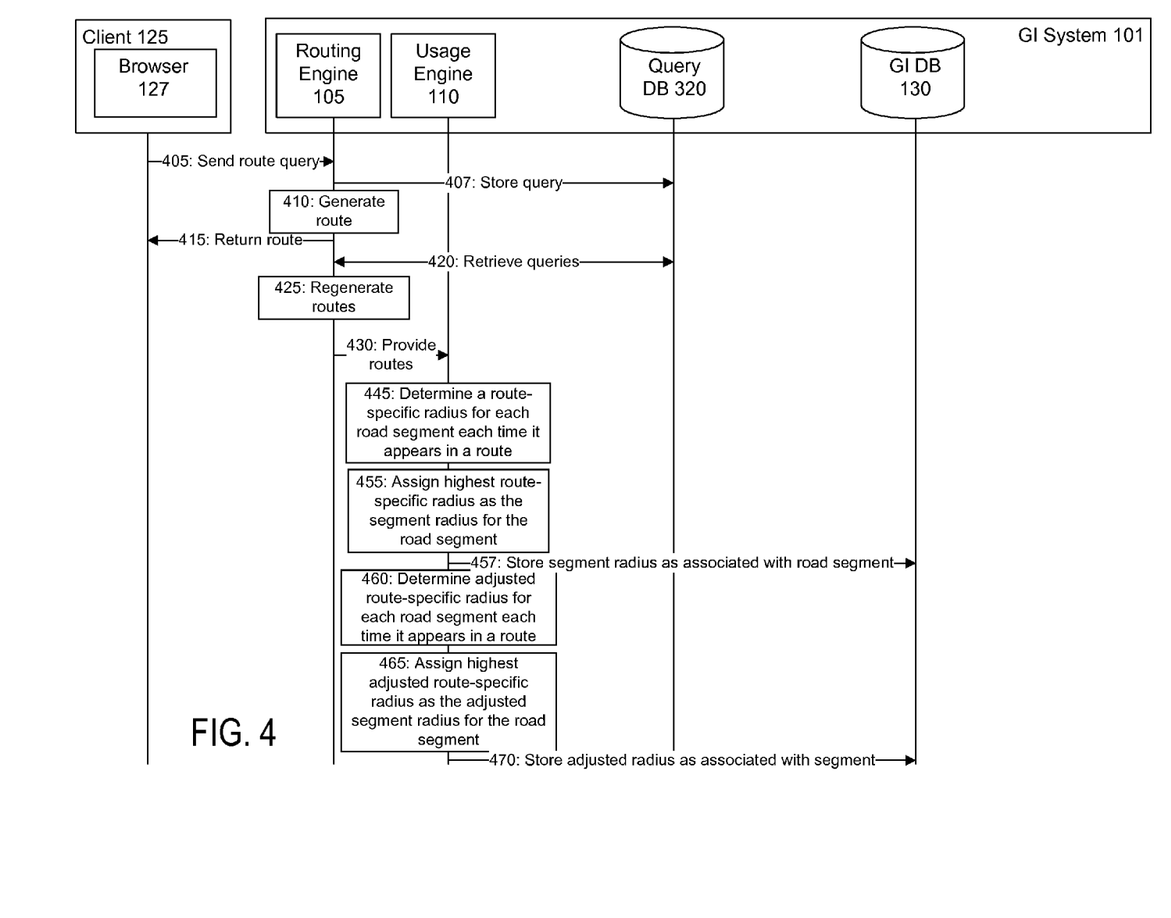
FIG. 4 is a data flowchart illustrating a method of analyzing routes generated in response to user queries according to one embodiment.
Figure 5:
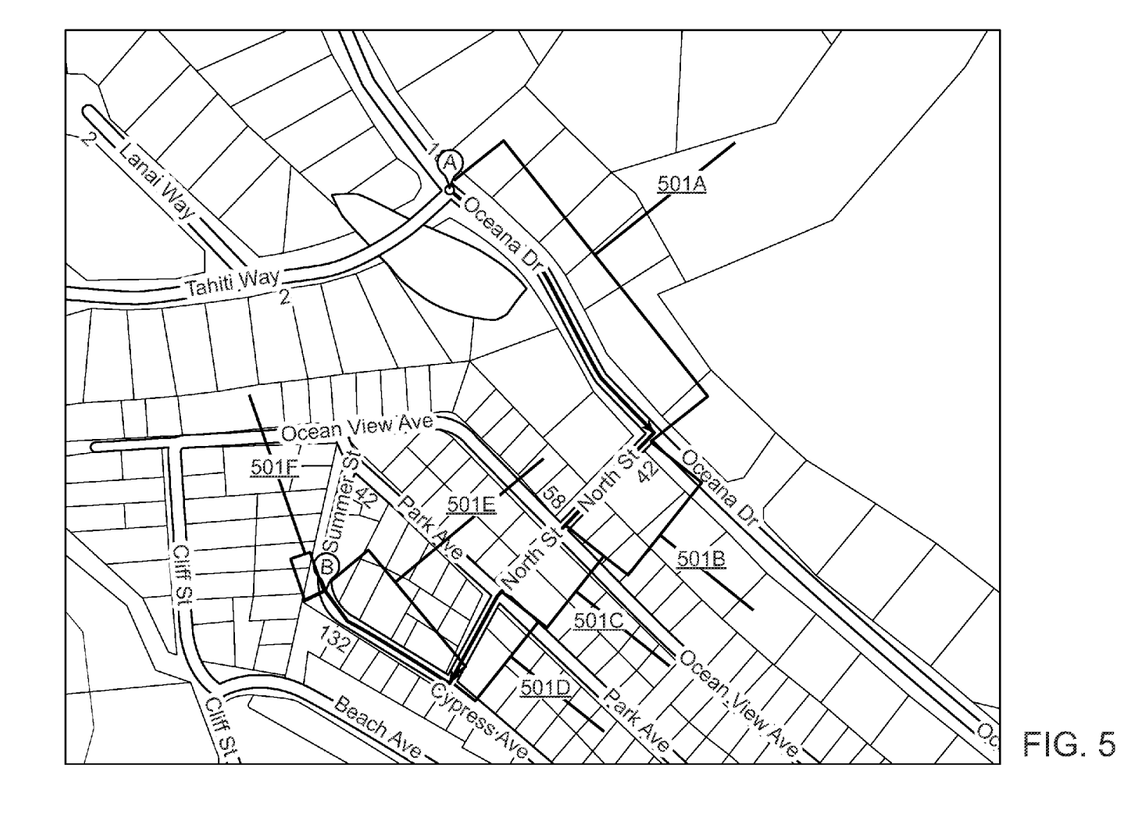
FIG. 5 is a map illustrating a route and its component road segments.

Referring to FIGS. 3-5, the working of the GI system 101 is described. FIG. 3 is a high-level block diagram illustrating a detailed view of the usage engine according to one embodiment. FIG. 4 is a data flowchart illustrating a method of analyzing routes generated in response to user queries according to one embodiment. FIG. 5 is a map illustrating a route and its component road segments. Queries for routes are sent 405 by users from clients 125 to the routing engine 105. The queries are stored 407 in the query database 320. The routing engine 105 also generates 410 a route and returns 415 the generated route to the user. In some embodiments, the generated route is stored as associated with the query for which it was generated in the query database 320.

In order to analyze the routes, the routing engine 105 retrieves 420 the stored queries and regenerates 425 a route for each query. The routing engine 105 provides 430 the regenerated routes to the usage engine 110. In one embodiment all stored queries are retrieved. Alternatively, all or some stored queries within a particular geographic area are retrieved. This allows for analysis of routes in batches. The generated routes are returned 430 to the usage engine 110. In an alternative embodiment, the usage engine 110 retrieves routes previously generated in response to user queries and stored in the query database 320.

Using a multi-step process the usage engine 110 determines various radii for each road segment represented in the routes that are being analyzed. In the first step, the usage engine 110 determines 445 a route-specific radius for each road segment in each route. FIG. 5 shows a route from endpoint A to endpoint B which has segments 501A-F. The route-specific radius for each road segment in each route is independent of whether that road segment appears in multiple routes. The route-specific radius is a function of the length of the route as a whole. The example route in FIG. 5 is 0.2 miles. The longer the route of which the road segment is a part, the higher the route-specific radius. The route-specific radius for each road segment is based on how far the road segment is from the closest endpoint in the route. Both the beginning and end of the route are endpoints. Thus the road segment in the middle of the route will have the highest route-specific radius of all the road segments in the route. Thus in the example of FIG. 5, segments 501C and 501D will have the highest route-specific radius of segments 501A-F. The road segment in the middle of a longer route will have a higher route-specific radius than the road segment in the middle of a shorter route. The closer a road segment is to an endpoint of the route, the lower the route-specific radius relative to the other road segments in the same route. Thus, segment 501F has a lower route-specific radius than segment 501E, which in turn has a lower route-specific radius than 501D. If the same road segment is part of multiple routes, there will be multiple route-specific radii determined for that road segment in this step. Any one of segments 501A-F may well be part of many routes being analyzed and thus will have multiple route-specific radii. Segment 501F is a driveway to point B and is thus likely is part of fewer routes than segments 501A-E which are public streets.

In one embodiment, the route-specific radius for a segment in a given route is determined as follows: route-specific radius=f(d1,d2) wherein d1 is the distance of the road segment to one endpoint of the route and d2 is the distance of the road segment to the second endpoint of the route. In one embodiment, the function is to take the minimum of d1 and d2 for the route-specific radius. The road segment whose route-specific radius is being assessed may or may not be included in the distance to the endpoint. When measuring distances to endpoints in distance units, such as meters or yards, the measurement can be from the end of the road segment closest to the endpoint to which distance is being measured. Alternatively, the distance to each endpoint is measured from the midpoint of the road segment. When measuring distances in numbers of road segments, the road segment being analyzed can be included in the count or not provided that the choice to count or not the road segment being analyzed is consistent throughout the analysis.

Table 1 illustrates example route-specific radii for each segment in the route illustrated in FIG. 5. In this example the radii are given in units of number of segments. The road segments at the end of the route, segment 501A and 501F have a route-specific radius of 1. The road segment whose route-specific radius is being determined is included in the measurement.

TABLE 1

Example Route-Specific Radii

| Segment in Route | d1 (distance to A) | d2 (distance to B) | Route-Specific Radius min(d1, d2) |
|---|---|---|---|
| 501A | 1 | 6 | 1 |
| 501B | 2 | 5 | 2 |
| 501C | 3 | 4 | 3 |
| 501D | 4 | 3 | 3 |
| 501E | 5 | 2 | 2 |
| 501F | 6 | 1 | 1 |

In the second step, for each road segment that is used in more than one route, the route-specific radii are aggregated and a segment radius is determined 455 for that road segment. The determined route-specific radii for the road segment are compared and the road segment is assigned the highest route-specific radius of all of the route-specific radii that were determined for that road segment in the first step as a segment radius. The segment radius is stored 457 in the GI database 130 as associated with the road segment. If a road segment is used in only one route, the route-specific radius determined in the first step is the segment radius and stored 457 in the GI database 130. Table 2 illustrates the route-specific radii for segments 501A-501F for the route shown in FIG. 5 as well as route-specific radii 2 and 3 for those segments from other routes where the other routes are not shown in FIG. 5. Note that not all segments have the same number of route-specific radii. If a road segment is used in fewer routes, it will have fewer stored route-specific radii. As shown in Table 2, there are only two route-specific radii for segment 501F.

TABLE 2

Example Segment radii

| Segment | Route-Specific Radius 1 | Route-Specific Radius 2 | Route-Specific Radius 3 | Segment radius |
|---|---|---|---|---|
| 501A | 1 | 5 | 3 | 5 |
| 501B | 2 | 4 | 0 | 4 |
| 501C | 3 | 3 | 1 | 3 |
| 501D | 3 | 2 | 1 | 3 |
| 501E | 2 | 1 | 0 | 2 |
| 501F | 1 | 0 |   | 1 |

In the third step, the segment radius for each road segment is put back in the context of each route of which that road segment is a part to determine an adjusted route-specific radius. For each route, starting at one end of the route, the segment radius of the first road segment is compared to the segment radius of each road segment that is adjacent to the first road segment. This includes not only the next road segment in the route but also other road segments that are adjacent to the first road segment even if not part of the route. The adjusted route-specific radius for the road segment under consideration is the minimum of: the segment radius of the road segment under consideration and the maximum of the segment radii of the adjacent road segments.

Referring to the example route in FIG. 5 and Table 3 the process of determining 460 adjusted route-specific radii for the segments of the route in FIG. 5 is described. For the purpose of simplifying this example, driveways that are adjacent to road segments 501A-501E, with the exception of 501F which is a driveway in the route, are not considered. Segment radii for the road segments that are adjacent to the route of FIG. 5 were determined as previously described for road segments 501A-F.

Segment radius for segment 501A is 5 and that is compared to the segments that are adjacent to 501A—the two additional segments on either end of Oceana Dr. as well as the segment of Tahiti Way and segment 501B. In this example, segment radii for adjacent segments are 3 except for segment 501B, which is 4 and thus the adjusted route-specific radius for 501A is 4.

Segment radius for segment 501B is 4 and that is compared to the segment radii for segments adjacent to it are: 3 for the two segments of Oceana Dr. with which it intersects (one of which is 501A—it is the segment radius of 501B and not the newly determined adjusted route-specific radius that is used in this determination); 4 for the two segments of Ocean View Ave.; and 3 for segment 501C. Thus the adjusted route-specific radius for 501B is 4.

Segment radius for segment 501C is 3 and that is compared to the segment radii for the segments adjacent to it: 4 for 501B, 3 for 501D, 4 for the two Ocean View Ave.; and 2 for the two Park Ave. segments. The adjusted route-specific radius for 501C is thus 3.

Segment radius for segment 501D is 3 and that is compared to the segment radii for the segments adjacent to it: 3 for 501C; 2 for each of the Park Ave. segments; 2 for 501E and then 1 for the other side of Cypress Ave. Thus the adjusted route-specific radius for 501D is 3.

Segment radius for segment 501E is 2 and that is compared to the segment radii for the segments adjacent to it: 1 for the other side of Cypress Ave.; 2 for the continuation of Summer St.; and 1 for the driveway at point B, road segment 501F. Thus the adjusted route-specific radius for 501E is 2.

Segment radius for segment 501F is 1 and that is compared to the segment radii for the two segments adjacent to it. The segment radius for 501E is 2 and the segment radius for the continuation for Summer St. is 2. Thus the adjusted route-specific radius for 501F is 1.

TABLE 3

Determining Adjusted Route-Specific Radii

| Segment | Segment radius | Adjusted Route-Specific Radius |
|---------|----------------|-------------------------------|
| 501A | 5 | 4 |
| 501B | 4 | 4 |
| 501C | 3 | 3 |
| 501D | 3 | 3 |
| 501E | 2 | 2 |
| 501F | 1 | 1 |

This process is repeated for the other routes being analyzed and thus multiple adjusted route-specific radii are determined for each of segments 501A-501F.

In the fourth step, the multiple adjusted route-specific radii generated for a single road segment are analyzed and the highest adjusted route-specific radius is assigned 465 as the adjusted radius for that road segment. This adjusted radius is then stored 470 in the GI database 130. The purpose of steps three and four is to smooth the changes in radius between adjacent road segments. Should more smoothing be desirable, steps three and four are repeated but using the adjusted radius in step three rather than the segment radius. As the process iterates, additional smoothing is accomplished.

Use Cases
Map Rendering

One use for the radius for a road segment is to determine which road segments to render on a map at a given zoom level. In one embodiment, individual road segments are rendered on a map as opposed to rendering a road as a single feature. What a user sees as a single road on a map is generated by rendering a series of adjacent road segments. When looking at a large area on a map, such as a whole state, it is most useful to see roads that are used to go longer distances. Roads that are primarily used to go just short distances would clutter the view. To display roads having a certain usage, the radius, or range of radii, corresponding to the desired usage is determined and only those road segments meeting the radius criteria are rendered on the map. This results in maps that are more useful to users.

The smoothing accomplished in determining an adjusted radius is important as not all road segments that make up a road have the same radius. Without smoothing, there is a greater chance that the radii for adjacent road segments have a large difference. In rendering road segments that have a radius above a threshold, this would then result in a road appearing to stop and then restart some distance later if the threshold radius for rendering the road segment falls in between the radii of adjacent road segments of the same road. This result would of course be very confusing to users. Smoothing minimizes the possibility of parts of roads not rendered when the rest of the road is.

Radius Heat Maps

Figure 6:
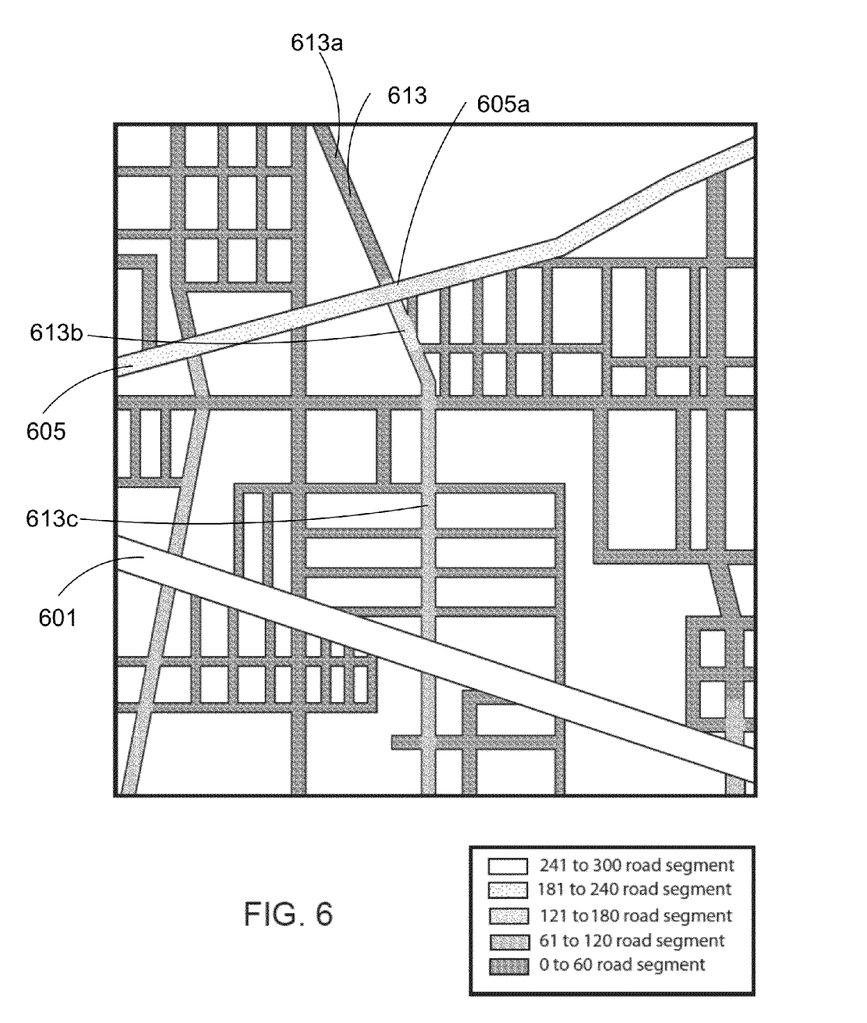
FIG. 6 is a heatmap illustrating one application of usage data generated by analyzing routes generated in response to user queries.

FIG. 6 is a heatmap illustrating one application of usage data generated by analyzing routes generated in response to user queries. The usage mapping engine 340 creates graphical representations of the usage of road segments. In one embodiment, the usage mapping engine 340 starts with a map and overlays onto a road segment on the map a color, texture or some other visual differentiation representing the radius for that road segment. For example, blue could represent the maximum radius and red the minimum radius with the color spectrum between blue and red representing the radii in between the maximum and the minimum. Alternatively, white represents the maximum radius and black the minimum radius with shades of grey representing the radii in between the maximum and minimum.

The example in FIG. 6 uses numbers of road segments to indicate the radius of the road segment. The radius could also be measured in distance units of kilometers, meters, miles, yards, feet, etc. The road 601 is all white indicating that it is part of routes where the total route distance is 241 to 300 road segments. Road 605 is mostly used in routes of 181 to 240 road segments in total length but there is a small portion of that road, portion 605*a*, that is used primarily in shorter routes. Road 613 illustrates how a single road can have different usages in different places. Portion 613A is used in short routes, portion 613*b* in longer routes of 121 to 180 road segments and portion 613 C in routes of 61 to 120 road segments in length.

The usage mapping engine 340 can use either the segment radius for a segment or the adjusted radius. Using the segment radius provides more accurate information. It is useful, for example for city planners, to know that a few blocks of a given road are used more for longer distance travel than other blocks of the same road.

The above description is included to illustrate the operation of certain embodiments and is not meant to limit the scope of the invention. From the above discussion, many variations will be apparent to one skilled in the relevant art that would yet be encompassed by the spirit and scope of the invention.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for the purpose of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method comprising:
receiving a plurality of routes traversing road segments between first endpoints and second endpoints on a geographic map, wherein multiple routes traverse a same road segment;
determining by one or more processors a route-based score for the road segment for each of the multiple routes that traverse the road segment, the route-based score for a route based on a first distance from the first endpoint of the route to the road segment and a second distance from the second endpoint of the route to the road segment;
determining a segment score describing usage of the road segment for the road segment based on the route-based scores; and
storing the segment score in association with the road segment on the geographic map.

2. The method of claim 1 wherein determining the route-based score for the road segment comprises:
selecting a highest distance from among the first distance and the second distance; and
using the highest distance as the route-based score.

3. The method of claim 1 wherein determining the segment score for each road segment comprises:
selecting a highest route-based score for the road segment from among the route-based scores; and
using the highest route-based score as the segment score for the road segment.

4. The method of claim 1 further comprising rendering a graphical representation of the geographic map including a graphical representation of the segment score.

5. The method of claim 1 further comprising:
evaluating the segment score for the road segment in connection with a display threshold; and
rendering a graphical representation of the geographic map, the graphical representation selectively displaying the road segment responsive to the evaluation with the display threshold.

6. The method of claim 1 further comprising:
adjusting the route-based scores for the road segment based on the segment score for the road segment and the segment scores for additional road segments adjacent to the road segment; and
determining an adjusted segment score for the road segment based on the adjusted route-based scores for the road segment.

7. A system comprising:
a non-transitory computer-readable storage medium storing executable computer program instructions for performing steps comprising:
receiving a plurality of routes traversing road segments between first endpoints and second endpoints on a geographic map, wherein multiple routes traverse a same road segment,
determining a route-based score for the road segment for each of the multiple routes that traverse the road segment, the route-based score for a route based on a first distance from the first endpoint of the route to the road segment and a second distance from the second endpoint of the route to the road segment,
determining a segment score describing usage of the road segment for the road segment based on the route-based scores, and
storing the segment score in association with the road segment on the geographic map; and
a processor for executing the computer program instructions.

8. The system of claim 7 wherein determining the route-based score for the road segment comprises:
selecting a highest distance from among the first distance and the second distance; and
using the highest distance as the route-based score.

9. The system of claim 7 wherein determining the segment score for each road segment comprises:
selecting a highest route-based score for the road segment from among the route-based scores; and
using the highest route-based score as the segment score for the road segment.

10. The system of claim 7 wherein the non-transitory computer-readable storage medium further stores executable computer program instructions for rendering a graphical representation of the geographic map including a graphical representation of the segment score.

11. The system of claim 7 wherein the non-transitory computer-readable storage medium further stores executable computer program instructions for performing steps comprising:
evaluating the segment score for the road segment in connection with a display threshold; and
rendering a graphical representation of the geographic map, the graphical representation selectively displaying the road segment responsive to the evaluation with the display threshold.

12. The system of claim 7 wherein the non-transitory computer-readable storage medium further stores executable computer program instructions for performing steps comprising:
adjusting the route-based scores for the road segment based on the segment score for the road segment and the segment scores for additional road segments adjacent to the road segment; and
determining an adjusted segment score for the road segment based on the adjusted route-based scores for the road segment.

13. A non-transitory computer readable medium storing executable program code comprising code that when executed by a processor performs the steps of:
receiving a plurality of routes traversing road segments between first endpoints and second endpoints in a geographic map, wherein multiple routes traverse a same road segment;
determining a route-based score for the road segment for each of the multiple routes that traverse the road segment, the route-based score for a route based on a first distance from the first endpoint of the route to the road segment and a second distance from the second endpoint of the route to the road segment;
determining a segment score describing usage of the road segment for the road segment based on the route-based scores; and
storing the segment score in association with the road segment on the geographic map.

14. The non-transitory computer readable medium of claim 13 wherein determining the route-based score for the road segment comprises:
selecting a highest distance from among the first distance and the second distance; and
using the highest distance as the route-based score.

15. The non-transitory computer readable medium of claim 13 wherein determining the segment score for each road segment comprises:
selecting a highest route-based score for the road segment from among the route-based scores; and
using the highest route-based score as the segment score for the road segment.

16. The non-transitory computer readable medium of claim 13 further comprising code for rendering a graphical representation of the geographic map including a graphical representation of the segment score.

17. The non-transitory computer readable medium of claim 13 further comprising code for:
evaluating the segment score for the road segment in connection with a display threshold; and
rendering a graphical representation of the geographic map, the graphical representation selectively displaying the road segment responsive to the evaluation with the display threshold.

18. The non-transitory computer readable medium of claim 13 further comprising code for:
adjusting the route-based scores for the road segment based on the segment score for the road segment and the segment scores for additional road segments adjacent to the road segment; and
determining an adjusted segment score for the road segment based on the adjusted route-based scores for the road segment.

* * * * *